Aug. 14, 1923.
G. FRENCH
1,464,567
CORN POPPER AND PEANUT ROASTER
Filed Nov. 3, 1921  2 Sheets-Sheet 2
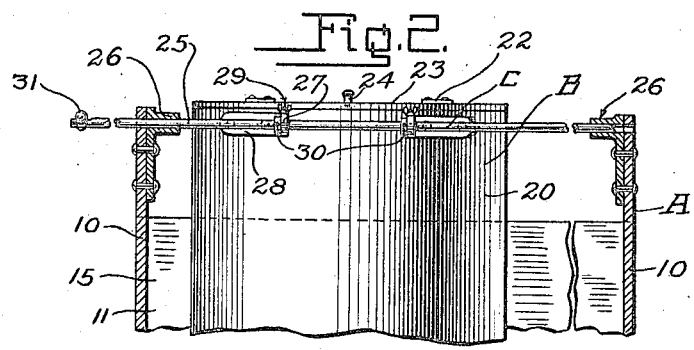
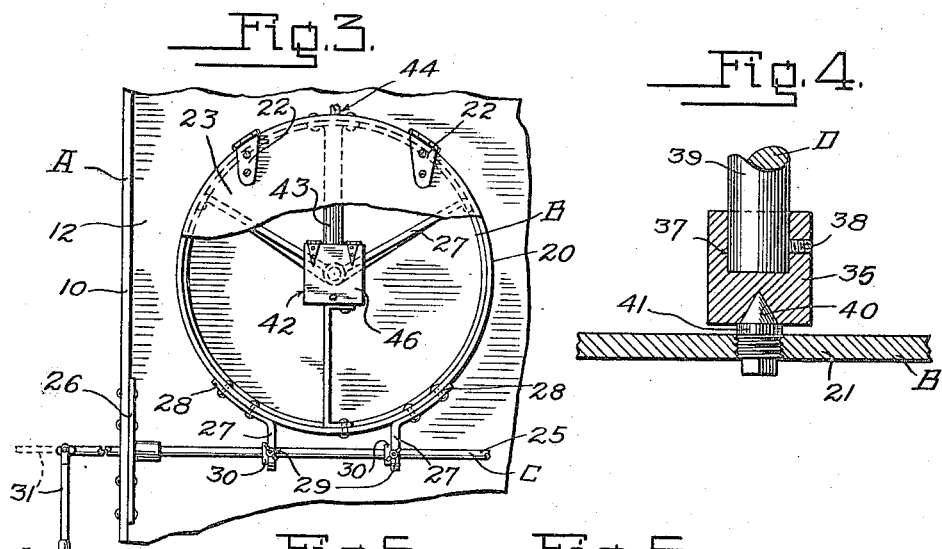
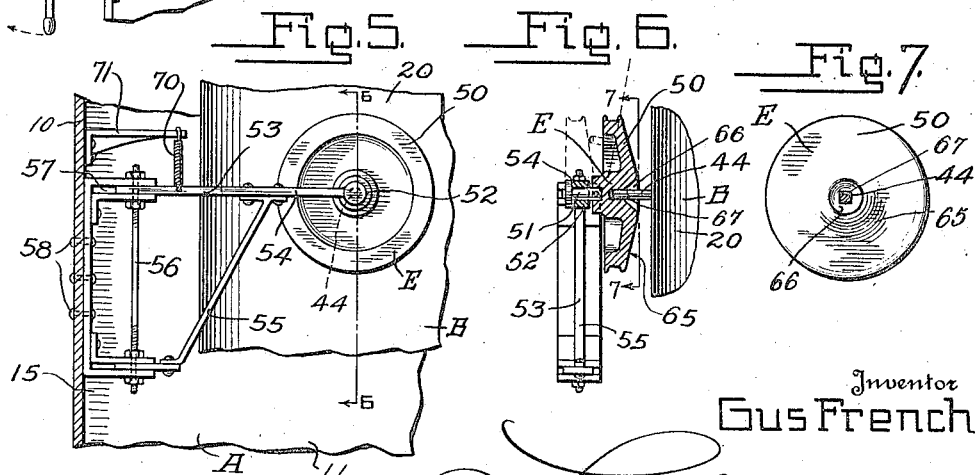
Inventor
Gus French Patented Aug. 14, 1923.

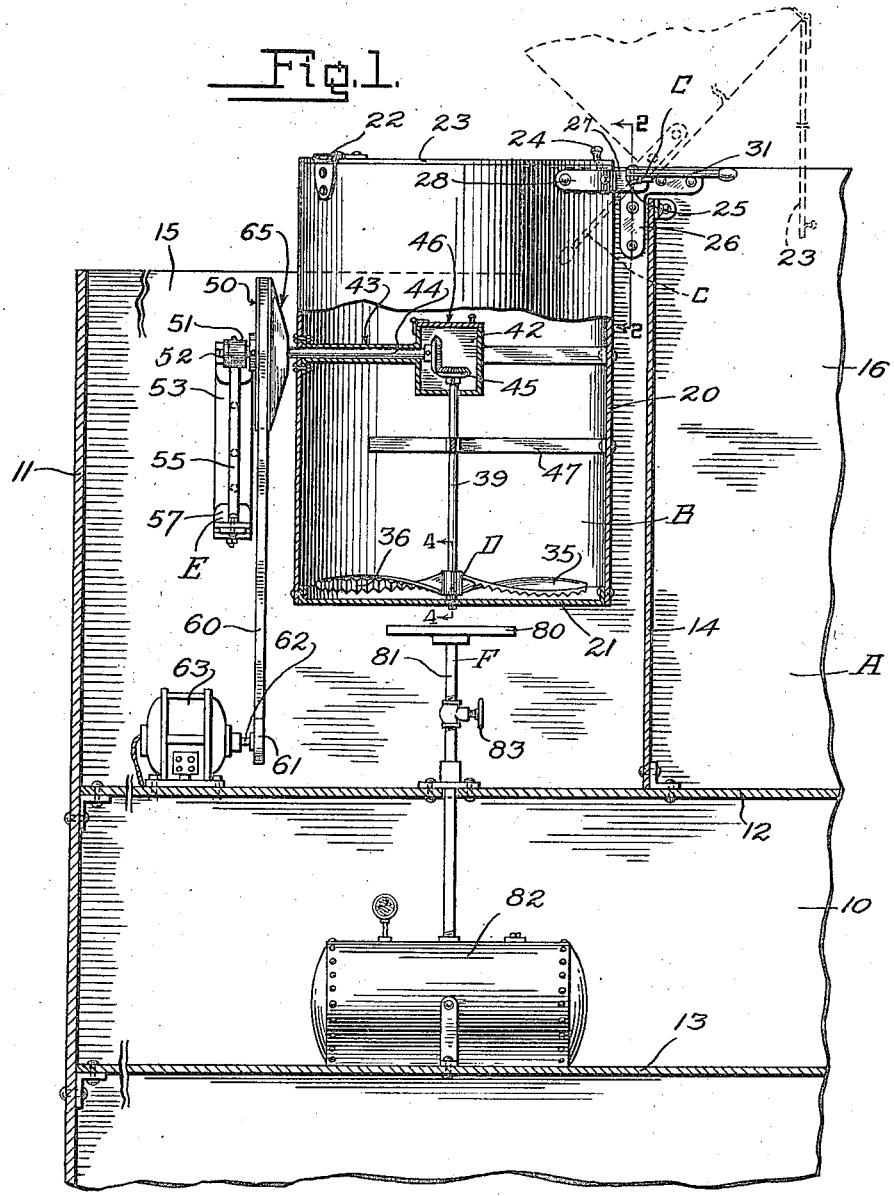

1,464,567

UNITED STATES PATENT OFFICE.

GUS FRENCH, OF DALLAS, TEXAS, ASSIGNOR TO MARY L. FRENCH, OF DALLAS, TEXAS.

CORN POPPER AND PEANUT ROASTER.

Application filed November 3, 1921. Serial No. 512,687.

*To all whom it may concern:*

Be it known that I, GUS FRENCH, a citizen of the United States, residing at Dallas, in the county of Dallas and State of Texas, have invented certain new and useful Improvements in Corn Poppers and Peanut Roasters, of which the following is a specification.

This invention relates to pop corn poppers and peanut roasters, and the primary object of the invention is to provide a novel device for permitting corn to be popped and peanuts to be roasted therein, said machine being of simple and durable construction and of an exceptionally compact nature, whereby the device can be readily mounted upon a wheeled cart or the like to permit the same to be readily moved around the streets.

Another object of the invention is to provide a novel receptacle in which the corn to be popped or the peanuts to be roasted are to be placed, the receptacle having a novel agitating means mounted therein constructed and arranged so as to move the roasting peanuts or popped popcorn from the bottom of the receptacle toward the top thereof and to move the unpopped corn or the unroasted peanuts toward the bottom of the receptacle.

A further object of the invention is to provide a novel means for supporting the receptacle, so as to permit the same to be readily swung to an inoperative position so that the contents thereof can be readily dumped into a suitable receiving container, said means also permitting the receptacle to be moved to an inoperative position away from the burner, when it is not desired to use the same for popping corn or for roasting peanuts.

A still further object of the invention is to provide an improved means for driving the agitator mounted in said receptacle, said driving means permitting the ready movement of the receptacle into and out of operative position without necessitating the removing of the drive belt or the stopping of the drive motor.

With these and other objects in view, the invention consists in the novel construction, arrangement and formation of parts, as will be hereinafter more specifically described, claimed and illustrated in the accompanying drawings, forming a part of this specification, in which:

Figure 1 is a vertical longitudinal section through the improved corn popping and peanut roasting machine.

Figure 2 is a transverse vertical section taken on the line 2—2 of Figure 1.

Figure 3 is a fragmentary plan view of the machine.

Figure 4 is an enlarged detail sectional view through the receptacle taken on the line 4—4 of Figure 1, illustrating the means of mounting the agitator in said receptacle.

Figure 5 is a fragmentary vertical transverse section through the device looking from the opposite side of Figure 2.

Figure 6 is a detail section taken on the line 6—6 of Figure 5, illustrating the means of connecting the agitator actuating means with the operating means therefor.

Figure 7 is a detail section taken on the line 7—7 of Figure 6.

Referring to the drawings in detail, wherein similar reference characters designate corresponding parts throughout the several views, the letter A indicates the frame or casing of the device; B, the receptacle for receiving the corn to be popped or the peanuts to be roasted; C, the novel means for mounting the receptacle in the frame or casing; D, the agitator arranged in the receptacle B; E the novel operating means for the agitator; and F, the burner and associate parts for heating the receptacle.

The frame or casing A can be constructed in any desired manner and of any preferred material, but as shown, the same is constructed of sheet iron and includes the side walls 10, and the end walls 11. A pair of spaced horizontal partitions 12 and 13 are disposed in the casing or frame for dividing the same into compartments. A vertically disposed partition 14 is carried by the horizontal partition 12 and divides the casing into a compartment 15 for the reception of the receptacle B and associate parts and a compartment 16 for receiving the corn that is popped or the peanuts that have been roasted.

The receptacle B is arranged within the compartment 15 adjacent to the partition 14 and is preferably formed of metal and can be of any desired size or shape. As shown the receptacle includes the cylindrical side wall 20 and the circular bottom wall 21. The upper edge of the circular side wall 20 has secured thereto by suitable hinges 22 a circular cover 23, which can be provided with a handle 24 if so desired. This receptacle is held in position by means of a novel connecting means C, which will now be described.

This connecting means C includes a transversely extending shaft 25, which is mounted for rotary movement in suitable bearings 26 carried by the side walls 10. These bearings not only support the shaft 25 for rotary movement, but also permit a sliding movement thereof, for a purpose which will be hereinafter more fully described. The shaft 25 receives the outwardly extending ears 27 formed on the brackets 28, which are secured to the outer surface of the cylindrical wall 20. These brackets 28 are arranged directly opposite the hinges 22, for a purpose, which will also be hereinafter more fully described. The ears 27 are held against rotary movement upon the shaft 25, by means of set screws 29, and if so desired, suitable stop collars 30 can be arranged on the shaft 25 for engaging one face of the ears and these stop collars can also be held in position by means of set screws or the like. One end of the shaft 25 protrudes outwardly beyond the casing A, and is provided with a hinged handle 31. This handle 31 is adapted to be normally positioned at right angles to the shaft 25, in order to form a crank therefor, and thereby permit the receptacle B to be swung out of the compartment 15 to permit the contents thereof to be dumped into the compartment 16, which as stated, is provided for receiving the popped corn or the roasted peanuts. Owing to the manner of hinging the lid 23, it can be seen that when the receptacle is moved to its dumping position as shown in dotted lines in Figure 1 of the drawings, the cover 23 will normally swing open by its own weight.

The receptacle is adapted to be normally positioned directly above the burner F, and when it is desired to move the receptacle away from the burner, it is merely necessary to swing the handle 31 of the shaft 25 in direct alignment therewith and push inwardly on the same so as to slide the shaft in its bearings 26. This, as can be clearly seen, will move the receptacle away from the burner.

The opposite side of the receptacle B from the attaching means C is supported by the operating means E, which will be hereinafter more fully described, and when the receptacle is moved to its inoperative position away from the burner, the receptacle will rest at its lower edge against the partition 14.

The agitator D is arranged within the receptacle B adjacent to its lower end, and includes a propeller shaped member 35, the blades of which have their lower surfaces grooved, as at 36, so as to slide over the unpopped corn and thus insure the leaving of the same at the bottom of the receptacle until the same pops. The hub 37 of the propeller shaped agitator 35 is secured by means of a set screw 38 to a vertically disposed shaft 39. The lower surface of the hub is provided with a core shaped opening 40 for the reception of the cone bearing 41, which is threaded into the lower wall 21 of the receptacle B. The agitator or propeller shaped body 35 acts in the nature of a screw when in operation and turns and moves the peanuts being roasted or the corn being popped in an upward path and thus effectively keeps the corn or peanuts from burning. The upper end of the shaft 39 extends into a housing 42, which carries bearings for the shaft 39 and a bearing 43 for the horizontally disposed shaft 44, which protrudes outwardly through the cylindrical wall 20 of the receptacle. The shafts 39 and 44 are operatively connected together by suitable bevelled gears 45. The gear casing 42 is provided with a wall 46, which can be readily manipulated so as to expose the gearing to view, in order to permit the oiling of the bearings and the gearing. If found necessary or desirable, the shaft 39 can be braced by means of a suitable spider 47, as can the gear housing 42. The extreme outer end of the shaft 44 can be slightly tapered if so desired, and is provided with a polygonal portion for engaging in the pulley wheel 50, which forms a part of the operating means E, which will now be described.

The operating means E consists of a stub shaft 51, which is rotatably mounted in a bearing 52, carried by the outer end of a swinging frame 53. This frame 53 includes an upper arm 54 and a bracing arm 55. These arms are rotatably mounted upon a vertically disposed rod 56, which is held in place by suitable brackets 57, which are riveted or bolted as at 58, to one side wall 10 of the casing A. The pulley 50 is keyed or otherwise secured to the stub shaft 51 and is provided with a grooved periphery for the pulley strap or belt 60. As shown, this strap is trained around a pulley wheel 61 secured to the armature shaft 62 of an electric motor 63, which may receive its energy from any suitable source. It is to be understood, of course, that the pulley wheel 50 can be driven in any other preferred manner.

This pulley wheel 50 is of novel construction and forms an important part of the invention and, as shown, the inner face thereof is substantially cone-shaped as designated by the reference character 65.

The axis of the cone shaped wall 65 is provided with an inwardly extending frame shaped recess 66, which terminates in a polygonal extension 67, in which is adapted to fit the polygonal end of the shaft 44.

It is desirable, but not necessary, that the pulley 50 be normally urged toward the shaft 44, and in order to accomplish this, a contractile coil spring 70 is provided, which has one terminal secured to the upper arm 54 of the frame 53, and its opposite end to a suitable arm 71 secured to the casing A.

The structure of the operating means, is such that when the receptacle B is swung back to its normal position after having been moved to its tilted position, the shaft 44 will automatically spring into the socket 67, and thus automatically couple the pulley 50 with the shaft 44. It can be seen that the outer end of the shaft 44 will engage the conical face 55 of the pulley 50 and thus gradually swing the same back against the tension of the spring 70, and when the shaft 44 comes into alignment with the conical shaped opening 66, the same will drop into the opening and the spring will swing the frame inwardly and the socket into receiving position for the same. Owing to the fact that the opening 66 is substantially conical shaped, the shaft 44 will be readily guided into the socket, and if the shaft is not in exact alignment with the axial center of the pulley due to the swinging back of the frame, the inclined wall of the conical shaped opening will guide the same into the socket.

In case, it is desirable to remove the receptacle from the casing at any time, it is merely necessary to pull the shaft 25 outwardly until the same rides out of the ears 27, at which time the frame 53 is swung outwardly, which leaves the receptacle B free, and permits the same to be readily lifted out of the compartment 15.

The burner F may be of any desired construction, and as shown the same includes the burner cap 80, to which is operatively connected a feed pipe 81, which extends into a suitable fuel tank 82. If desirable, the fuel may be forced from the tank by air pressure or the like. A valve 83 may be arranged in the feed pipe 81, in order to control the flow of fuel therethrough.

Owing to the construction of the improved device, it can be seen that the receptacle B can be used either for popping corn or for roasting peanuts, and the device will effectively and efficiently perform both of these objects.

From the foregoing description, it can be seen that an improved corn popper or peanut roaster has been provided, which will permit the corn to be popped or the peanuts to be roasted, to be readily placed into the receptacle and readily dumped therefrom after being popped or roasted.

Changes in details may be made without departing from the spirit or scope of this invention; but,

I claim:

1. In a peanut roasting or corn popping machine, a cylindrical receptacle including a lower wall, a vertically disposed operating shaft arranged at the axis of the receptacle, a propeller shaped agitator keyed to the lower end of the shaft, an adjustable cone bearing carried by the lower wall of the receptacle supporting the hub of the propeller shaped agitator, the blades of the propeller shaped agitator having a plurality of ribs formed thereon, a drive shaft disposed in the receptacle, and means operatively connecting the shafts together.

2. In a peanut roasting or corn popping machine, a swinging receptacle for receiving the corn to be popped or the peanuts to be roasted, an operating shaft rotatably mounted in the receptacle and having one end thereof extending outwardly of the receptacle, a swinging frame arranged adjacent to the receptacle, a stub shaft rotatably carried by the outer end of the frame, a pulley wheel keyed to the stub shaft, the inner face of the pulley wheel being cone shaped, the cone shaped inner face of the pulley wheel having an enlarged inwardly extending cone shaped recess at the axis thereof terminating in a socket for receiving the extended end of the operating shaft, means for driving the pulley wheel, and means for normally urging the pulley wheel toward the operating shaft.

GUS FRENCH.